United States Patent [19]

Orino et al.

[11] Patent Number: 5,500,754
[45] Date of Patent: Mar. 19, 1996

[54] OPTICAL TRANSMITTER-RECEIVER

[75] Inventors: Kanjo Orino; Mikio Sakai, both of Kawasaki; Tetsuo Sakanaka, Sagamihara, all of Japan

[73] Assignee: Canon Kabushiki Kaisha, Tokyo, Japan

[21] Appl. No.: 974,997

[22] Filed: Nov. 12, 1992

[30] Foreign Application Priority Data

Nov. 15, 1991 [JP] Japan .................................. 3-328086

[51] Int. Cl.⁶ .................................................. H04B 10/00
[52] U.S. Cl. .......................... 359/156; 359/172; 359/159
[58] Field of Search .................................... 359/129, 130, 359/131, 152, 156, 159, 172

[56] References Cited

U.S. PATENT DOCUMENTS

| | | | |
|---|---|---|---|
| 4,252,404 | 2/1981 | DiVita | 359/129 |
| 4,879,763 | 11/1989 | Wood | 359/156 |
| 4,888,816 | 12/1989 | Sira, Jr. | 359/152 |
| 5,113,403 | 5/1992 | Block et al. | 359/152 |

FOREIGN PATENT DOCUMENTS

| | | | |
|---|---|---|---|
| 0305734 | 12/1989 | Japan | 359/156 |

Primary Examiner—Leo Boudreau
Assistant Examiner—Rafael Bacares
Attorney, Agent, or Firm—Fitzpatrick, Cella, Harper & Scinto

[57] ABSTRACT

A two-way optical transmitter in which optical transmitters each having light projecting means and light receiving means on an optical axis intersecting the optical axis of the light projecting means are disposed in opposed relationship with each other with a predetermined distance interposed therebetween and which effects two-way optical transmission, wherein a polarizing beam splitter, having a cemented surface forming a certain angle with respect to the optical axes of the light projecting means and the light receiving means is installed near the point of intersection between the two optical axes, linearly polarized light from the light projecting means is reflected by the cemented surface of the polarizing beam splitter to thereby provide transmission light, and an optical axis leading from the polarizing beam splitter to the light projecting means or an optical axis leading from the polarizing beam splitter to the light receiving means is set at an angle of approximately 45° with respect to the vertical direction when the apparatus is seen from on the optical axis of the transmitted light.

6 Claims, 5 Drawing Sheets

FIG. 3A (OPTICAL 32 TRANSMITTER)

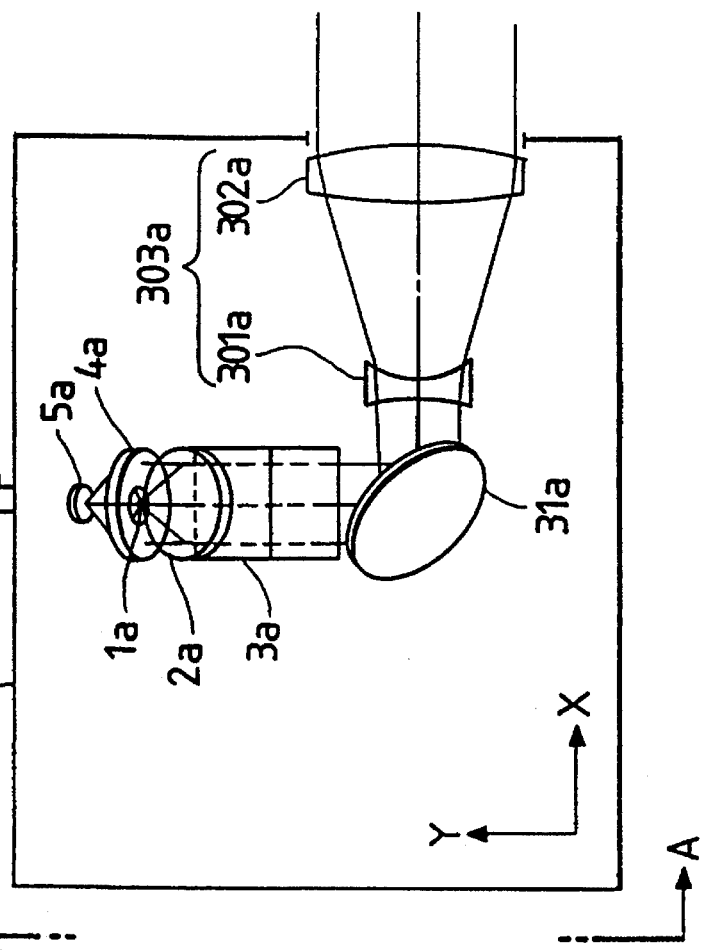
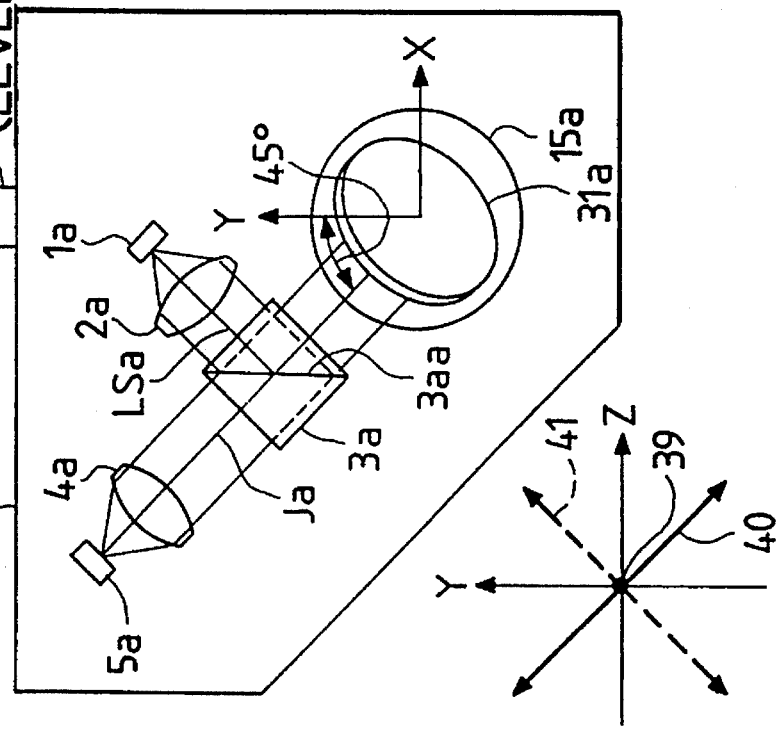
FIG. 4A
FIG. 4B

OPTICAL TRANSMITTER-RECEIVER

BACKGROUND OF THE INVENTION

1. Field of the Invention

This invention relates to a two-way optical transmitter, and particularly to a two-way optical transmitter which utilizes linearly polarized light of a modulated light signal, for example, with space as a transmission medium and which is good in transmission efficiency and can accomplish transmission with high accuracy and good operability.

2. Related Background Art

There have heretofore been proposed various two-way optical transmitters designed to effect the transmission and reception of light signals with space as a transmission medium.

FIG. 5A of the accompanying drawings is a schematic view of the essential portions of the optical system of a two-way optical transmitter according to the prior art utilizing polarized light. In FIG. 5A, the reference numerals 16 and 17 designate a pair of left and right optical transmitters comprising the same construction and disposed in opposed relationship with each other with a predetermined distance interposed therebetween. The right optical transmitter 17 is disposed in such a positional relation that the left optical transmitter 16 has been rotated by 90° about the X-axis which is the direction of optical transmission. FIG. 5B of the accompanying drawings is a plan (X-Z plane) view of the optical transmitter 17.

Description will now be made of a case where a light signal is transmitted from the left optical transmitter 16 to the right optical transmitter 17.

A linearly polarized laser beam La emitted from a laser diode 1a has its direction of polarization coinciding with the direction of the Z-axis as indicated by arrow 19. The laser beam La passes through a lens unit 2a having positive power and becomes a substantially parallel light beam and enters the cemented surface 3aa (obliquely disposed at an angle of 45° with respect to the X-Z plane) of a polarizing beam splitter 3a. Almost all of the laser beam La which has entered the cemented surface 3aa is reflected and enters a beam expander 101a having a lens 14a and a lens 15a.

The laser beam La which has entered the beam expander 101a has its beam diameter enlarged and emerges as linearly polarized light having a plane of polarization in the direction of the Z-axis (the direction of arrow 19) from the beam expander 101a.

That is, the laser beam La emerges from the optical transmitter 16 and enters the right optical transmitter 17. The laser beam La which has entered the right optical transmitter 17 passes through a beam expander 101b, whereafter it enters a polarizing beam splitter 3b.

Almost all of the linearly polarized laser beam La having its plane of polarization in the direction of the Z-axis which has entered the polarizing beam splitter 3b passes through the cemented surface (obliquely disposed at an angle of 45° with respect to the X-Y plane) of the polarizing beam splitter 3b and is condensed on a light receiving element 5b by a lens unit 4b having positive power. Thereby the light signal is received.

What has been described above also holds true when a light signal is transmitted from the right optical transmitter 17 to the left optical transmitter 16.

That is, a laser beam Lb from a laser diode 1b has its direction of polarization coinciding with the direction of the Y-axis as indicated by arrow 21. Almost all of this linearly polarized laser beam Lb is reflected by the cemented surface 3bb of a polarizing beam splitter 3b and enters the left optical transmitter 16 through the beam expander 101b.

Almost all of the laser beam Lb which has entered the optical transmitter 16 passes through the beam expander 101a and through the cemented surface 3aa of the polarizing beam splitter 3a, and is condensed on a light receiving element 5a by a lens unit 4a having positive power. In FIGS. 5A and 5B, the two-way transmission of the light signal is effected by such a construction.

In the prior-art two-way optical transmitter shown in FIGS. 5A and 5B, two kinds of optical transmitters differing in the arrangement and structure of elements (parts) from each other are disposed in opposed relationship with each other to thereby effect two-way optical transmission. Therefore, to utilize these optical transmitters, the distinction of the combination of the optical transmitters and the distinction of the handling thereof are required. This has led to the problem that confusion in operation results.

SUMMARY OF THE INVENTION

The present invention has as its object the provision of a two-way optical transmitter in which various elements are set appropriately and optical transmitters of the same structure are used, whereby any confusion in operation can be obviated and two-way optical transmission can be accomplished easily and efficiently.

According to a preferred embodiment of the present invention, in a two-way optical transmitter wherein optical transmitters each having light projecting means and light receiving means disposed on an optical axis intercepting the optical axis of said light projecting means are disposed in opposed relationship with each other with a predetermined distance interposed therebetween to thereby effect two-way optical transmission, a polarizing beam splitter having its cemented surface forming a certain angle with respect to the optical axes of said light projecting means and said light receiving means is installed near the point of intersection between the optical axis of said light projecting means and the optical axis of said light receiving means, linearly polarized light from said light projecting means is reflected by or transmitted through the cemented surface of said polarizing beam splitter to thereby provide transmission light, and the optical axis leading from said polarizing beam splitter to said light projecting means or the optical axis leading from said polarizing beam splitter to said light receiving means is set at an angle of approximately 45° with respect to the vertical direction when the apparatus is seen from on the optical axis of the transmitted light.

BRIEF DESCRIPTION OF THE DRAWINGS

FIGS. 3A and 3B are schematic views of the essential portions of the optical transmitter of a second embodiment of the present invention.

FIGS. 4A and 4B are schematic views of the essential portions of the optical transmitter of the second embodiment of the present invention.

DETAILED DESCRIPTION OF THE PREFERRED EMBODIMENTS

Figure 1:
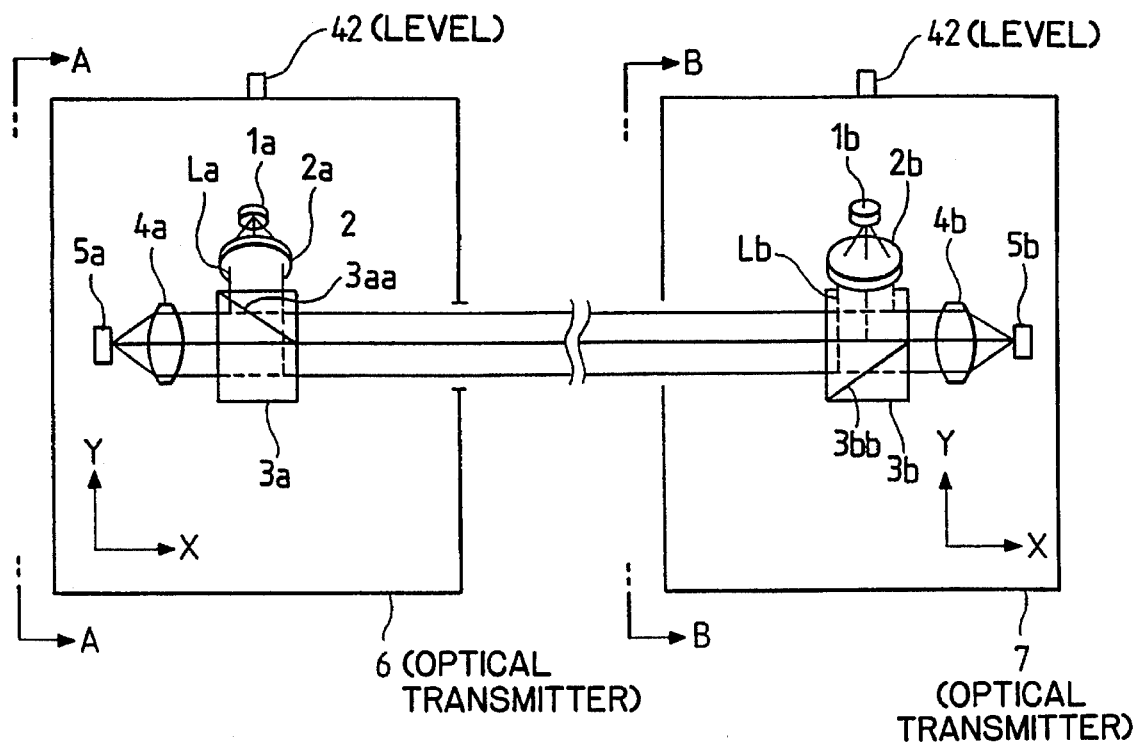
FIG. 1 is a schematic view of the essential portions of the optical system of a first embodiment of the present invention.
Figure 1:
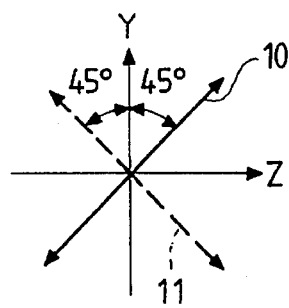
Figure 1:
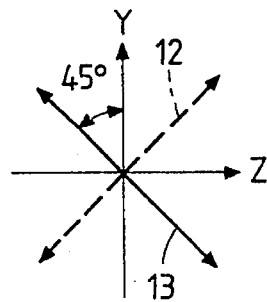

FIG. 1 is a schematic view of the essential portions of the optical system of a first embodiment of the present invention. In FIG. 1, the reference numerals 6 and 7 designate left and right optical transmitters, respectively, which are of the same construction and are disposed in opposed relationship with each other with a predetermined distance interposed therebetween.

For example, the left optical transmitter 6 has a laser diode 1a, the light of which has a plane of polarization in the direction of arrow 10. The left optical transmitter 6 further has a lens unit 2a having positive power, a polarizing beam splitter 3a having a cemented surface 3aa for reflecting the laser beam La from the lens unit 2a having positive power toward the partner optical transmitter 7, a lens unit 4a having positive power for condensing a laser beam Lb transmitted from the partner optical transmitter 7 and passed through the cemented surface 3aa of the polarizing beam splitter 3a, and a light receiving element 5a for receiving the laser beam condensed by the lens unit 4a having positive power.

The laser diode 1a and the lens unit 2a having positive power together constitute light projecting means, and the light receiving element 5a and the lens unit 4a having positive power together constitute light receiving means.

The right optical transmitter 7 is entirely the same in construction as the left optical transmitter 6, with the exception that the laser beam Lb from a laser diode 1b comprises linearly polarized light having a plane of polarization in the direction of arrow 13.

Figure 2A:
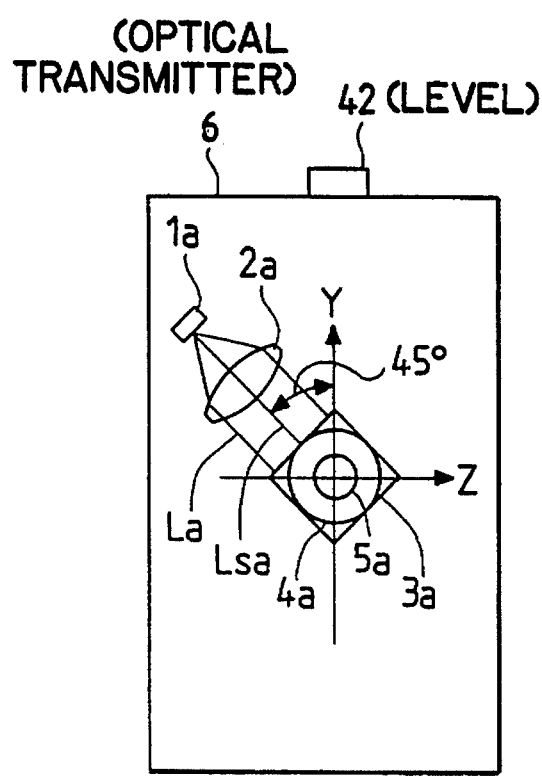
FIGS. 2A and 2B illustrate portions of the optical system of FIG. 1.
Figure 2B:
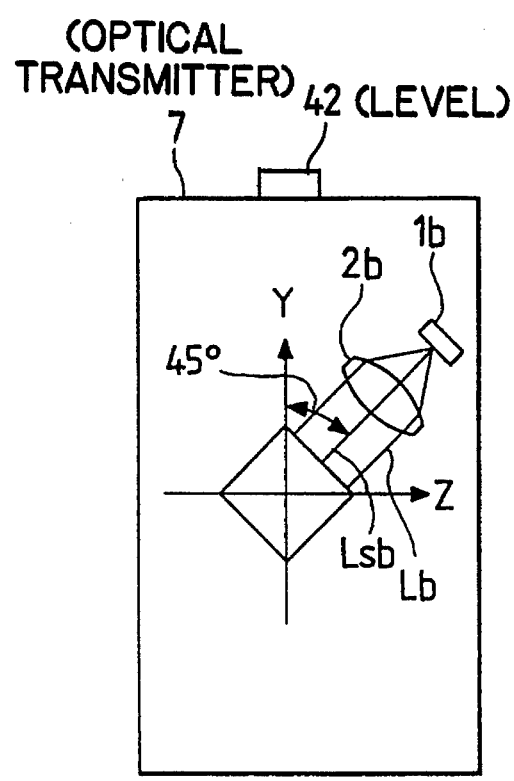

FIG. 2A is a schematic view of the left optical transmitter 6 of FIG. 1 as it is seen in the direction of arrow A, and FIG. 2B is a schematic view of the right optical transmitter 7 of FIG. 1 as it is seen in the direction of arrow B. As shown in FIGS. 2A and 2B, an optical axis LSa (LSb) extending from the laser diode 1a (1b) to the beam splitter 3a (3b) forms 45° with respect to the Y-axis (45° with respect to the vertical direction).

Description will now be made of a case where a light signal is transmitted from the left optical transmitter 6 to the right optical transmitter 7.

The linearly polarized laser beam La emitted from the laser diode 1a has its direction of polarization inclined by 45° with respect to the Y-axis, as indicated by arrow 10. The laser beam La passes through the lens unit 2a having positive power and becomes a substantially parallel light beam, and enters the cemented surface 3aa of the polarizing beam splitter 3a. Almost all of the laser beam La which has entered the cemented surface 3aa is reflected and enters the right optical transmitter 7. The laser beam La which has entered the right optical transmitter 7 then enters the polarizing beam splitter 3b.

Almost all of the linearly polarized laser beam La which has entered the polarizing beam splitter 3b and which has a plane of polarization inclined by 45° with respect to the Y-axis passes through the cemented surface 3bb of the polarizing beam splitter 3b and is condensed on the light receiving element 5b by the lens unit 4b having positive power. Thereby the light signal is received.

On the other hand, when a light signal is transmitted from the right optical transmitter 7 to the left optical transmitter 6, the process is just converse to what has been described above. That is, the laser beam Lb from the laser diode 1b has its direction of polarization inclined by 45° with respect to the Y-axis, as indicated by arrow 13.

Almost all of the linearly polarized laser beam Lb is reflected by the cemented surface 3bb of the polarizing beam splitter 3b and enters the left optical transmitter 6. Almost all of the laser beam Lb which has entered the optical transmitter 6 passes through the cemented surface 3aa of the polarizing beam splitter 3a and is condensed on the light receiving element 5a by the lens unit 4a having positive power. In FIG. 2, the two-way transmission of the light signal is effected by such a construction.

Description will now be made of the features of the constituents of the present embodiment.

In the present embodiment, the laser beam La introduced, for example, from the laser diode 1a into the lens unit 2a having positive power is substantially linearly polarized light having a polarization ratio of about 100:1 to 500:1 and rightwardly forms an angle of 45° with respect to the Y-axis. Its plane of polarization and the cemented surface 3aa (the polarized component separating surface) of the polarizing beam splitter 3a form an angle of 45° therebetween, and such thin film that about 98% of the laser beam La is reflected and the remainder of the laser beam La is transmitted and is deposited on the cemented surface 3aa by evaporation.

This extinction ratio depends also on the angle of incidence onto the cemented surface 3aa, and it is usual that the reflectance of a ray forming an inclination of ±5° with respect to a reference angle of incidence 45° is reduced to the order of 50–70%. The deterioration of the extinction ratio here not only leads to the energy loss of the transmission light, but also leads to the great possibility of the transmitted light being reflected by other surfaces and returning to the light receiving element, with a result that cross talk is caused. Accordingly, the transmission light of its own is made into a parallel light beam and uniformized to the reference angle of incidence 45° by the polarizing beam splitter of its own to thereby reduce the occurence of cross talk.

The polarization azimuth of the transmission light La from the left optical transmitter 6 rightwardly forms an angle of 45° with respect to the Y-axis, and this transmission light enters the polarizing beam splitter 3b of the right optical transmitter 7. Since the two apparatuses 6 and 7 are of the same structure, the cemented surfaces of the polarizing beam splitters 3 are in such a positional relation to the plane of polarization of this incident light (reception light) that the transmittance thereof is about 98%.

This extinction ratio, as previously described, depends also on the angle of incidence onto the cemented surface and therefore, in the present embodiment, the transmission light is made into a parallel light beam so as to reduce the deterioration of the extinction ratio here and reduce the loss of the reception power.

The parallel light Lb from the optical transmitter 7 transmitted through the polarizing beam splitter 3a is condensed on the light receiving element 5a by the lens unit 4a having positive power. The light receiving element 5a is required to be better in sensitivity.

In the present embodiment, use is made of a small element whose effective light receiving area is of a diameter of 1 mm or less, like an avalanche photodiode. By such an element being used, the loss of received light energy is decreased as much as possible and the lens unit 4a having positive power is used to condense the laser beam on the light receiving element 5a.

The transmission light from the right optical transmitter 7 is received by the left optical transmitter 6 via a similar course. Reception power becomes greatest on both sides when the direction of polarization of the transmission light forms an angle of 45° with respect to the Y-axis (vertical) direction as indicated by arrows 10 and 13 in FIG. 1, and when the reception power at such time is $P_0$ and the reception power when a laser beam having a direction of polarization deviating by an angle θ from 45° is received is Pθ, there is substantially the relation that $P\theta=P_0 \cos^2\theta$, and the reduction in light receiving efficiency becomes remarkable for an angle exceeding θ>20°.

Accordingly, in each of the optical transmitters 6 and 7, the direction of polarization of the transmission light, i.e., the optical axis Ls leading from the polarizing beam splitter 3 to the laser diode 1 is about 45° within the range of ±20° from 45° with respect to the vertical direction when the apparatus is seen from its front. Ideally the angle is 45°.

Further, in order to make the degree of orthogonality between the transmission and reception lights more accurate, levels 42 are used in the left and right optical transmitters 6 and 7 to effect horizontal leveling in a plane orthogonal to the transmission light (the alignment of the Z-axis in the Y-Z plane). Thereby the transmission and reception lights are efficiently separated from each other, thereby accomplishing two-way optical transmission of high reliability which suffers little from the loss of reception power.

In the present embodiment, the optical axis LSa leading from the laser diode 1a of the optical transmitter 6 to the polarizing beam splitter 3a has been shown as forming an angle of 45° leftwardly upwardly with respect to the Y-axis, but alternatively may be designed to form an angle of 45° rightwardly upwardly or leftwardly downwardly or rightwardly downwardly with respect to the Y-axis.

Further, in the present embodiment, there has been shown a case where the reflected light from the cemented surface 3aa of the polarizing beam splitter 3a is used as the transmission light, but the laser diode 1a and the light receiving element 5a may be changed for each other and be installed in such a positional relation that the emitted light from the laser diode 1a is almost transmitted through the cemented surface 3aa of the polarizing beam splitter 3a, to thereby obtain a similar effect.

Also, the present embodiment has been shown with respect to a case where the cemented surface of the polarizing beam splitter 3a forms an angle of 45° with respect to the optical axis LSa of the laser diode 1a side, but the laser diode 1a may be disposed within the range of 30° to 60° as far as the space of the apparatus permits.

Figure 3B:
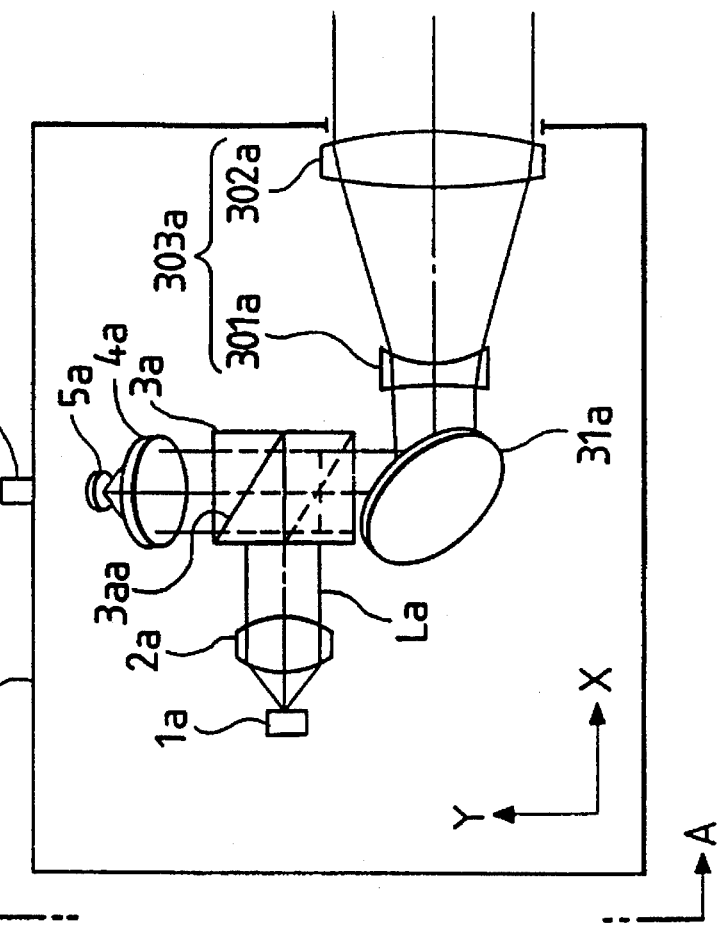

FIGS. 3A, 3B, 4A and 4B are schematic views of the essential portions of the left optical transmitter of a second embodiment of the present invention. FIG. 3A is a side view, FIG. 3B is a schematic view taken along the direction of arrow A in FIG. 3A, FIG. 4A is a side view, and FIG. 4B is a schematic view taken along the direction of arrow A in FIG. 4A. In FIGS. 3A, 3B, 4A and 4B, the same elements as those shown in FIG. 1 are given the same reference characters.

Figure 3B:
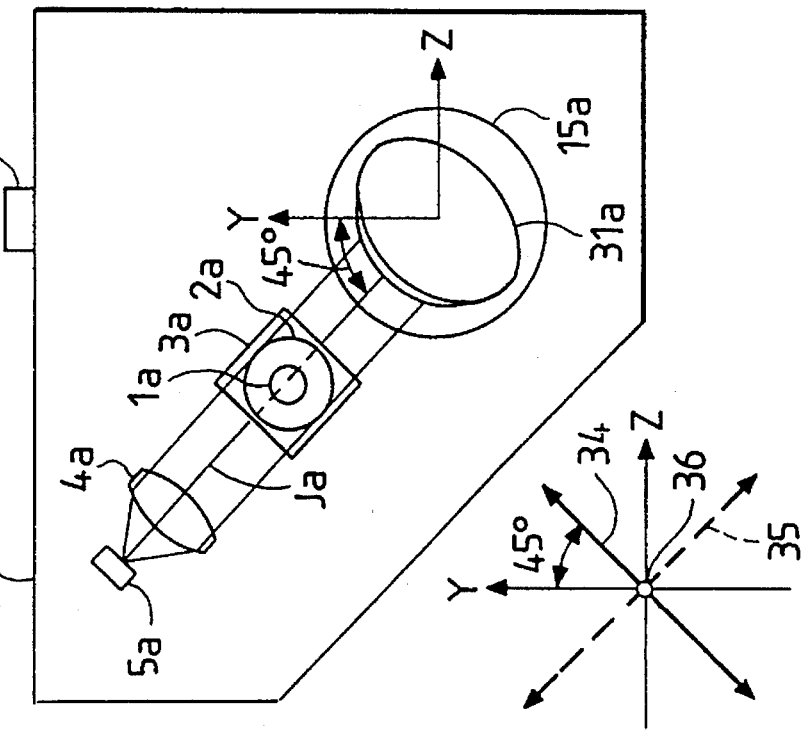
Figure 5A:
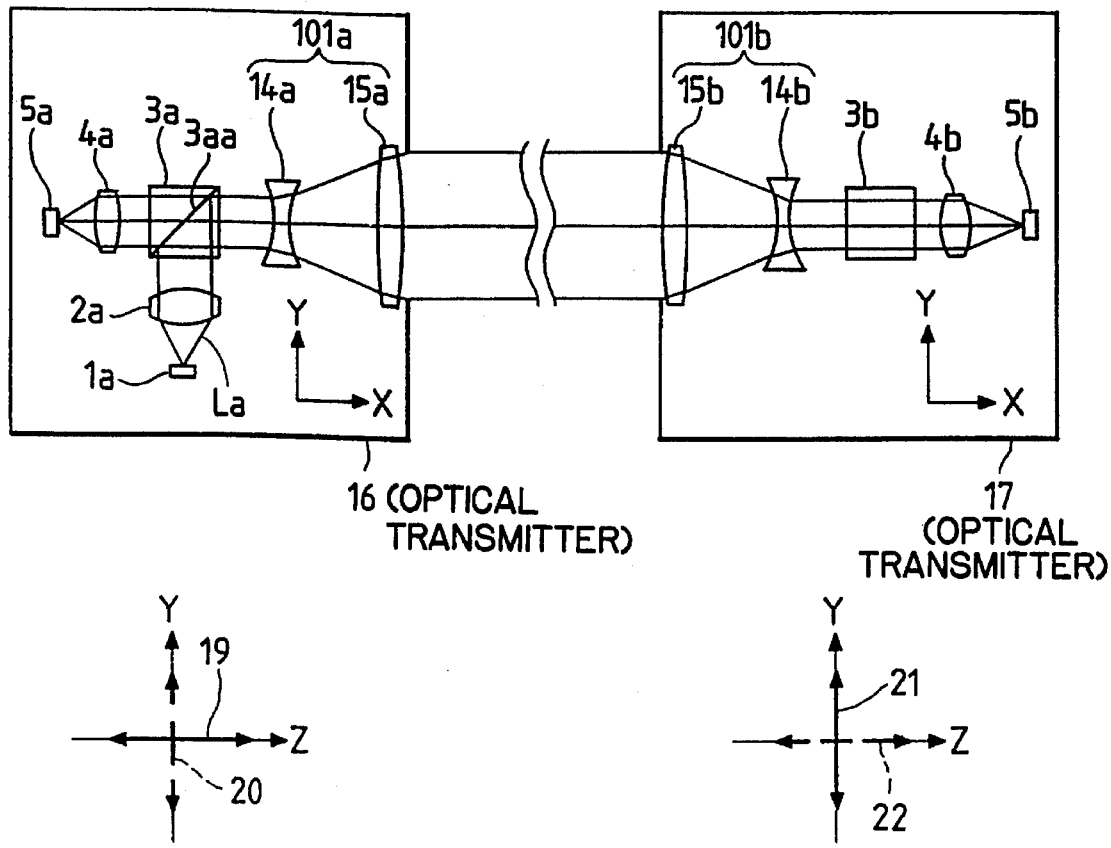
FIGS. 5A and 5B are schematic views of the essential portions of a two-way optical transmitter according to the prior art.
Figure 5B:
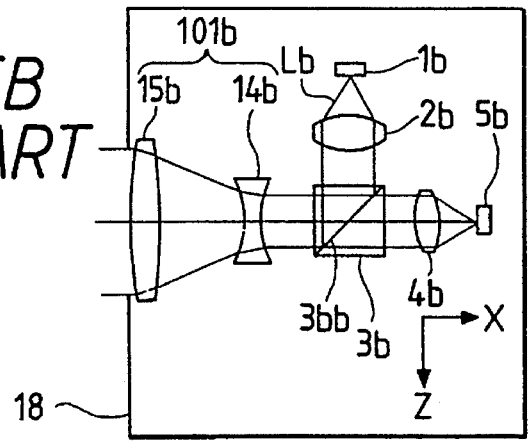

Both the optical transmitter 32 of FIG. 3 and the optical transmitter 37 of FIG. 4 are designed so as to be capable of effecting two-way optical transmission with apparatuses of the same structure opposed to each other.

In FIGS. 3A and 3B, the reference character 31a designates a mirror, and the reference character 303a denotes a beam expander having two lenses 301a and 302a. The embodiment of FIGS. 3A and 3B differs from the embodiment of FIG. 1 in that these two elements are provided, and in the other points, the two embodiments are the same.

In FIGS. 3A and 3B, a laser beam La from the laser diode 1a is made into a parallel light beam by the lens unit 2a having positive power and is reflected by the cemented surface 3aa of the polarizing beam splitter 3a, whereafter it is reflected in the direction of 90° by the mirror 31a and has its beam diameter enlarged through the beam expander 303a and is transmitted to the other optical transmitter (not shown) opposed to the optical transmitter 32. The direction of polarization of the laser beam at this time is rightwardly at 45° with respect to the Y-axis in the Y-Z plane, as indicated by arrow 34 in FIG. 3.

The laser beam which has entered the opposed other optical transmitter passes through the beam expander, is reflected by the mirror and enters the polarizing beam splitter. The laser beam almost passes through the polarizing beam splitter and is caused to enter the light receiving element by the lens unit having positive power. Thereby the light signal is received.

What has been described above also holds true of the optical transmission from the opposed other optical transmitter, and the polarization azimuths of the laser beams are in orthogonal relationship with each other, as indicated by arrow 35 in FIG. 3. In the present embodiment, two-way optical transmission is accomplished thereby.

In FIGS. 3 and 4, the optical axis Ja leading from the polarizing beam splitter 3a to the light receiving element 5a forms an angle of 45° with respect to the Y-axis (45° with respect to the vertical direction when the apparatus is seen from the front thereof).

The present embodiment is of a construction advantageous in achieving the compactness of the apparatus when there is required an optical system of great aperture in effecting long distance communication.

In FIGS. 3A, 3B, 4A and 4B the laser diode 1a and the light receiving element 5a may be changed for each other and these may be installed in such a positional relation that the emitted light from the laser diode 1a is almost transmitted through the cemented surface 3aa of the polarizing beam splitter 3a, to thereby obtain a similar effect. In such case, the laser diode is set so that the plane of polarization of the laser may coincide with a plane containing the optical axes of the laser diode and the light receiving element.

In FIGS. 3A, 3B, 4A and 4B the optical axis leading from the polarizing beam splitter 3a to the mirror 31a forms an angle of 45° leftwardly upwardly with respect to the Y-axis, but alternatively may form an angle of 45° rightwardly upwardly or leftwardly downwardly or rightwardly downwardly. Also, the mirror 31a may be located between the lens 301a and the lens 302a.

Also, in FIGS. 3A, 3B, 4A and 4B, the laser diode 1a, the lens unit 2a having positive power and the polarizing beam splitter 3a may be at positions reversed by 180° about the optical axis leading from the polarizing beam splitter 3a to the light receiving element 5a while keeping the positional relation among the three.

Further, in the above-described embodiment, the laser diode 1a and the light receiving element 5a may be changed for each other.

According to the present invention, as described above, there can be achieved a two-way optical transmitter in which respective elements are set appropriately and optical transmitters of the same structure are used, whereby any confusion in operation can be obviated and two-way optical transmission can be effected easily and efficiently.

Particularly, the present invention has the effect that when an attempt is made to effect two-way communication by a combination of two kinds of products, any confusion in operation can be obviated and also cross talk occurring optically can be minimized.

What is claimed is:

1. A transmitter-receiver comprising:

light projecting means for projecting light;

light receiving means for receiving light; and optical means for transmitting therethrough or reflecting the light projected by said light projecting means and also reflecting or transmitting light received by said light receiving means therethrough to thereby direct the light received by said light receiving means to said light receiving means;

the optical axis of said light projecting means or the optical axis of said light receiving means being oriented at an angle within the range of 45°±20° with respect to the vertical direction and wherein said optical means is a polarizing beam splitter.

2. A transmitter-receiver according to claim 1, wherein the light projected by said light projecting means is polarized at a predetermined angle.

3. A transmitter-receiver according to claim 1, further comprising a level for levelling said transmitter-receiver.

4. A transmitter-receiver according to claim 1, wherein said polarizing beam splitter has a cemented surface.

5. A transmitter-receiver according to claim 1, wherein said light projecting means is provided with a light source and a lens unit having positive refractive power.

6. A transmitter-receiver according to claim 1, wherein said light receiving means is provided with a sensor and a lens unit having positive refractive power.

* * * * *

UNITED STATES PATENT AND TRADEMARK OFFICE
CERTIFICATE OF CORRECTION

PATENT NO. : 5,500,754
DATED : March 19, 1996
INVENTOR(S) : KANJO ORINO, et al.

It is certified that error appears in the above-indentified patent and that said Letters Patent is hereby corrected as shown below:

COLUMN 4

Line 40, "occurence" should read --occurrence--.

Signed and Sealed this

Sixteenth Day of July, 1996

Attest:

BRUCE LEHMAN

Attesting Officer          Commissioner of Patents and Trademarks